(12) United States Patent
Bean et al.

(10) Patent No.: US 6,737,830 B2
(45) Date of Patent: May 18, 2004

(54) BATTERY CHARGING USING A PORTABLE ENERGY STORAGE DEVICE

(75) Inventors: Heather N. Bean, Fort Collins, CO (US); Mark N. Robins, Greeley, CO (US); Matt Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 10/188,488

(22) Filed: Jul. 2, 2002

(65) Prior Publication Data

US 2004/0004462 A1 Jan. 8, 2004

(51) Int. Cl.7 .................. H01M 10/44; H01M 10/46
(52) U.S. Cl. ............................................. 320/125
(58) Field of Search ....................... 320/125, 166, 320/107, 112, 113, 114, 115, 103

(56) References Cited

U.S. PATENT DOCUMENTS

| | | | |
|---|---|---|---|
| 5,572,108 A | 11/1996 | Windes | |
| 5,659,236 A | * 8/1997 | Hahn | |
| 5,939,860 A | * 8/1999 | William | |
| 6,265,851 B1 | 7/2001 | Brien et al. | |
| 6,404,168 B1 | 6/2002 | Shoji | |

* cited by examiner

*Primary Examiner*—Edward H. Tso

(57) ABSTRACT

A battery charger provides remote or untethered charging of a rechargeable battery. The battery charger provides untethered charging either in situ within a battery-powered device or external to the device. The battery charger comprises a power converter and an energy storage device connected to the power converter. A battery charging system comprises the battery charger and independent electrical connection devices. One connection device connects the battery charger to an external energy source to acquire energy that is stored in the storage device. Another connection device connects the battery charger to a battery for charging. The connection devices are independent and battery charging is untethered in that the battery charger need not be connected to the external energy source while the battery charger charges the battery. A method of charging the battery comprises charging the battery with energy stored in a portable energy storage device.

33 Claims, 4 Drawing Sheets

BATTERY CHARGING USING A PORTABLE ENERGY STORAGE DEVICE

TECHNICAL FIELD

The invention relates to charging a rechargeable battery. In particular, the invention relates to charging a rechargeable battery with a portable energy storage device.

BACKGROUND OF THE INVENTION

Portable, battery-powered devices, such as digital cameras for example, generally depend on a battery-based power supply for their operational power. In particular, battery-based power supplies that employ rechargeable batteries are often used in such portable devices. The rechargeable batteries provide the device with operational power without requiring a continuous connection to a fixed power source, such as an AC electrical outlet, thus allowing for portable operation. The device can be operated from battery power until the rechargeable batteries become depleted. When depleted, the rechargeable batteries are either recharged in situ, or removed from the device for recharging and may be replaced with fully charged, replacement batteries.

Conventionally, to effect in situ battery recharging, an alternating current (AC) adapter and an associated power cord or power cords are employed. Typically, the AC adaptor is plugged into an available AC electrical power outlet and the associated power cable is plugged into a power input port of the device. The AC adaptor converts AC energy available from the electrical outlet into direct current (DC) energy that is then fed into the device to charge the batteries inside the device. During recharge, the device is fixed or tethered to the AC electrical power outlet. Once recharged, the power cable may be disconnected and the device is once again portable, deriving operational power from the charged batteries.

Unfortunately, devices that utilize conventional battery-based power supplies and in situ recharging often suffer from a relatively slow recharge time of the battery. In particular, most conventional rechargeable batteries typically require about one hour to several hours to charge. Even modem, so-called 'rapid charging' batteries may take anywhere from several minutes to nearly an hour to acquire and store an energy charge level sufficient to power to the device for a 'normal' operating period. Thus, the portable device is not truly portable during battery charging, since an electrical connection to a fixed energy source (e.g., the AC power outlet) tethers the device during in situ recharging.

In addition, many practical situations make in situ charging difficult if not impossible. For example, an AC outlet may be available to a user of a portable battery powered device for only a very limited amount of time (e.g., while traveling). Thus, while the AC electrical outlet is temporarily available, there may be insufficient time to charge the battery once it has become depleted.

Conventionally, a spare fully charged battery is often carried along with the AC adapter and cable. The spare battery may be inserted in the device to replace a depleted battery when in situ charging is not possible or is inconvenient. Spare batteries add to the overall weight of the device thus decreasing the 'portability' of such a device. Moreover, spare batteries only postpone the inevitable need for access to the fixed energy source for a time sufficient to effect battery charging.

Accordingly, it would be advantageous to have a way to facilitate battery charging that did not depend on having access to a fixed energy source for a time sufficient to effect battery charging. Such a way of battery charging would solve a long-standing need in the area of portable, battery-powered devices.

SUMMARY OF THE INVENTION

The present invention provides remote or untethered charging of a rechargeable battery used with a portable battery-powered device. In particular, the present invention provides untethered charging either as in situ charging of the battery within the device or as charging of the battery that has been removed from or is external to the device. Moreover, the present invention charges the battery without a need for a connection to a conventional, fixed external energy source during the time the battery is being charged. As such, the present invention provides an independent, 'untethered', 'unplugged' or effectively a 'cordless' means of battery charging.

In an aspect of the invention, a battery charger is provided that acquires and stores energy. The stored energy is used to charge a battery of a portable battery-powered device. The battery charger comprises means for converting energy acquired from an external energy source and means for storing energy connected to an output of the power converting means. The power converter means converts the acquired energy into a form suitable for storing in the energy storing means. Once stored, the energized battery charger may be disconnected from the external energy source. The energy is stored by the energized battery charger until used to charge a rechargeable battery.

The storage of energy from the external energy source is effectively independent of battery charging according to the present invention. Moreover, the energized battery charger provides a means for untethered charging of the rechargeable battery. During untetherered charging, the energized battery charger is connected to the rechargeable battery and the energy stored in the energized battery charger is used to charge the battery.

In some embodiments, the battery is charged in situ or while the battery is within the battery-powered device. In other embodiments, the battery is removed from the device prior to charging the battery using the energized battery charger of the present invention. In all of the embodiments described herein, the battery charger advantageously is not or need not be electrically connected to, plugged into, or otherwise restrained by, constrained by or tethered to, a fixed external source of energy during battery recharging. Thus, the battery charger of the present invention may be considered a 'cordless' or 'untethered' battery charging means. In other aspects of the present invention, a battery charging system and a method of charging a rechargeable battery are provided.

Advantageously, the battery charging means of the present invention provides a user of a battery-powered device with more battery recharging flexibility than the user had before the present invention. En essence, the present invention frees the battery-powered device and/or battery from an attachment to the fixed external energy source during charging since the battery is charged using energy stored in the energized charger instead of being charged while the charger is connected to the fixed external energy source, such as an AC outlet or a DC outlet or port. Moreover, the battery charger of the present invention enables a user of the portable device to acquire and store sufficient energy in a matter of seconds or minutes. Preferably, once energized the charger possesses sufficient energy to charge a battery and the user is free to recharge the battery with the energized battery charger at the user's convenience. Certain embodiments of the present invention have other advantages in addition to and in lieu of the advantages described hereinabove. Theme and other features and advantages of the invention we detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
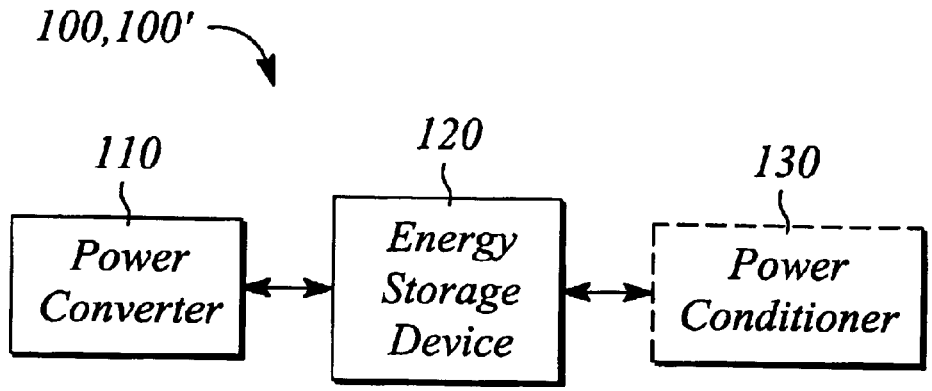
FIG. 1 illustrates a block diagram of an embodiment of a battery charger according to the present invention.

FIG. 1 illustrates a block diagram of a battery charger 100 according to the present invention. The battery charger 100 charges a rechargeable battery of a battery-powered device. The battery charger 100 comprises a power converting means 110 connected to means for storing energy 120. The power converter means 110 is any device or circuit used to convert power for storage purposes. The power converter means 110 receives and converts power/energy from an external energy source while the battery charger 100 is electrically connected to the energy source. The external energy source is any conventional external energy source, generally referred to herein as a 'fixed' external energy source, and is described further below. The converted energy produced by the power converter means 110 is stored by the energy storing means 120.

The energy storing means 120 is any storage device or circuit that can store energy relatively rapidly as compared to a time that it takes to recharge a typical rechargeable battery that is to be recharged according to the present invention. Preferably, the energy storing means 120 stores energy in a matter of seconds or minutes, rather than in one or more hours. According to the present invention, rapid energy acquisition and storage by the energy storing means 120 effectively decouples a time required to acquire and store energy from a time necessary to charge the battery using the stored energy. As such, battery charging is independent of energy acquisition and storage using the battery charger of the present invention.

Depending on the embodiment, the energy storing means 120 is a capacitor, and preferably is an ultracapacitor, which is described further below. It is also within the scope of the invention for the energy storing means 120 to be a rapid-charging battery, for example. The energy stored in the energy storing means 120 is used to charge the battery of the portable device in an untethered fashion. Further, the energy storing means 120 can rapidly store an amount of energy sufficient to recharge a rechargeable battery that is used in a battery-powered device. By 'sufficient amount of energy to recharge or charge' a rechargeable battery, it is meant that the amount of stored energy is sufficient to charge the rechargeable battery such the recharged battery has sufficient energy to again power the battery-powered device for typical or normal operational period.

The battery may be of any rechargeable battery chemistry including, but not limited to, Nickel Cadmium (NiCad), Nickel-Metal Hydride (NiMH), and Lithium Ion chemistries in any form factor including, but not limited to, AA, AAA, D and C. The battery-powered device is any device including, but not limited to, a digital camera, a digital video camera, a laptop or notebook computer, a personal digital assistant (PDA), a compact disk (CD) player, and a cellular telephone, to name a few. It is also within the scope of the present invention to charge the battery of virtually any other battery-powered type device or device that uses a battery, from an automobile and other such motorized vehicles and equipment to a simple battery-powered device such as a flashlight. As such, 'the sufficient amount of energy' to power the device for typical operation is variable, and not intended to be a limitation of the present invention.

According to a preferred embodiment of the present invention, an ultracapacitor is employed as the energy storing means 120. Energy stored in the ultracapacitor 120 is stored by a capacitance. Therefore, the ultracapacitor 120 acquires and stores energy much more rapidly than a battery is capable of being charged. The present invention is described hereinafter with reference to the preferred ultracapacitor energy storing means 120, for convenience and without limitation. Other energy storing means mentioned above and including any that may be devised by one skilled in the art can be readily substituted for the ultracapacitor-based preferred embodiment and all such means are within the scope of the present invention.

The ultracapacitor energy storing means 120 is energized with the energy supplied by the power converter 110 using the energy derived from the external energy source. The energy stored by the ultracapacitor 120 is then used to charge a battery. In particular, the battery charger 100 is electrically connected to the battery to charge the battery, either in situ or separately from the battery-powered device, as described further below. Advantageously, the battery charger 100 charges the battery independently of the external energy source, in that the battery charger 100 is not attached to and receiving energy from the external energy source when or while the battery is being recharged. As such, the battery charger 100 of the present invention is a portable energy storage device and is characterized herein as 'cordless' or 'effectively cordless' due to the battery charger's 100 untethered relationship to the external energy source during battery recharging.

In some embodiments, the external energy source is an AC energy source such as a conventional AC electrical outlet, which is fixed and not portable. In such embodiments, the power converter means 110 is preferably an AC-DC converter that converts an AC input voltage and current into a DC output voltage and a DC output current. For example, the AC-DC converter 110 may comprise a transformer and a rectifier. The transformer converts the input AC voltage having a first magnitude to a second AC voltage having a second magnitude. Typically, the first magnitude is greater than the second magnitude. The second AC voltage is then transformed or rectified by the rectifier into the DC output voltage. Preferably, the DC output voltage is suitable for energizing the ultracapacitor 120. The AC-DC converter may further comprise a regulator portion or circuit. The regulator circuit regulates the DC output voltage and/or the DC output current. For example, the AC-DC converter may convert an AC input voltage of 120VAC into a regulated DC output voltage of 5VDC. One skilled in the art is familiar with AC-DC converters 110 and could readily choose an appropriate converter 110 for a given application without undue experimentation. All of such converters are within the scope of the present invention.

In other embodiments of the battery charger 100', the external energy source is a DC energy source including, but not limited to, an auxiliary equipment port in an automobile or an aircraft. For example, many automobiles are equipped with auxiliary equipment ports (e.g. cigarette lighters) that may function as a 12 VDC power/energy source. All such auxiliary equipment ports are considered herein as being conventional fixed external energy sources also for the purposes of the present invention. In such embodiments, the power converter means 110' is a DC—DC converter that converts a DC input voltage and current of the DC energy source into a DC output voltage and current. Preferably, the converted DC output voltage/current is suitable for energizing the ultracapacitor 120. The DC—DC converter 110' may further comprise a regulator that regulates the DC output voltage and/or a DC output current. For example, the DC—DC converter 110' may convert a 12VDC of an auxiliary equipment port in an automobile to a regulated 5VDC output voltage. One skilled in the art is familiar with DC—DC converters 110' and could readily choose an appropriate converter 110' for a given application without undue experimentation. All of such converters are within the scope of the present invention.

Figure 2A:
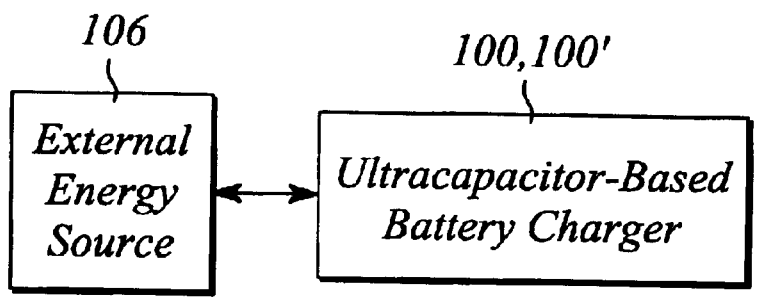
FIG. 2A illustrates a block diagram of an embodiment of the battery charger of the present invention connected to an external power source for energizing the battery charger.
Figure 2B:
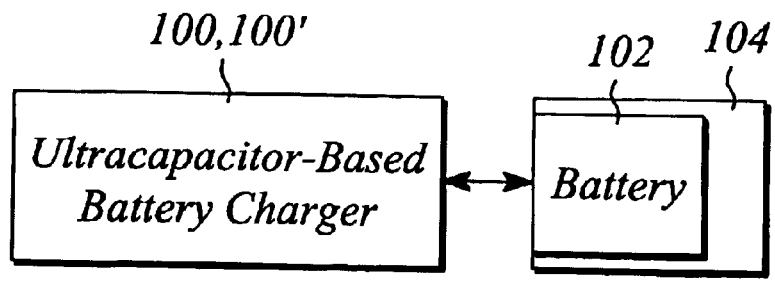
FIG. 2B illustrates a block diagram of an embodiment of the battery charger connected to a battery of a battery-powered device for charging the battery according to the present invention.

FIG. 2A illustrates a block diagram of the preferred ultracapacitor-based battery charger 100, 100' connected to an external power source 106 for energizing the battery charger 100, 100'. FIG. 2B illustrates a block diagram of the preferred ultracapacitor-based battery charger 100, 100' connected to a battery 102 of a battery powered device 104 for charging the battery 102 according to the present invention.

The DC output voltage and the DC output current of the power converter 110, 110' are applied to the ultracapacitor 120 to energize or store energy in the ultracapacitor 120. The ultracapacitor 120, also sometimes referred to as a 'supercapacitor' 120, is a capacitor having a capacitance that is typically orders of magnitude higher than a conventional capacitor. Unlike batteries which store and release energy by way of a chemical reaction, the ultracapacitor 120 stores energy as an electric charge on or associated with one or more electrodes. As such, the ultracapacitor 120 may be charged very rapidly, typically on the order of seconds or minutes, relative to one to several hours typically required to charge the rechargeable battery 102. The stored charge in the ultracapacitor 120 serves as a source of energy that is subsequently used to charge the battery 102.

Most ultracapacitors are electrochemical capacitors that store energy electrostatically by polarizing an electrolytic solution. A voltage applied to an electrode suspended in the electrolyte polarizes the electrolyte and causes electrolyte ions to migrate to the electrode. The electrode acts as a first plate of a capacitor while the electrolyte ions act as a second plate. Since the plates so-formed are separated on the order of Angstroms from one another, capacitance per unit area of the electrode can be orders of magnitude higher than conventional capacitors with a pair of electrodes. In practice, an ultracapacitor is constructed with a pair of electrodes suspended in an electrolyte. When a voltage is applied to the electrode pair, electrolyte ions of a first polarity are attracted to a first electrode of the pair while electrolyte ions of a second polarity are attracted to the second electrode of the pair. Such electrochemical capacitors having two, oppositely charged electrodes suspended in the electrolyte are sometimes referred to as 'double-layer' capacitors owing to the formation of complementary polarized electrolyte ion layers at each electrode of the pair.

Electrochemical ultracapacitors generally employ a highly porous electrode material to further increase obtainable capacitances. For example, a porous carbon-based electrode material is used in ultracapacitors marketed under the trade name PowerCache® by Maxwell Technologies, San Diego, Calif., USA. Various polymer compounds are also employed as electrodes in ultracapacitors. For example, Rudge et al., U.S. Pat. No. 5,527,640, "Electrochemical Supercapacitors", disclose an ultracapacitor that utilizes a polymer electrode. It is not the intent to limit the present invention to any particular ultracapacitor technology. The above-described ultracapacitors, as well as other ultracapacitors either known in the art or which may be developed, are within the scope of the present invention.

The DC output voltage and DC output current produced by the power converter 110 preferably are suitable for energizing the ultracapacitor 120. Suitability of the voltage and current is generally dictated or established by a selection of a particular ultracapacitor 120 for use in the battery charger 100, 100' of the present invention. In particular, a design and an implementation or manufacture of the selected ultracapacitor 120, including a type or implementation of electrodes used therein, generally establish a desirable or essentially optimum operational voltage and maximum input current for the ultracapacitor 120. For example, a suitable DC voltage for charging the PowerCache® ultracapacitors manufactured by Maxwell Technologies is given by a data sheet for the ultracapacitor as approximately 3.7 VDC. One skilled in the art, having selected an ultracapacitor for use with the present invention, may readily determine the suitable voltage and current from a specification of the selected ultracapacitor 120.

The converted DC output voltage and DC output current produced by the power converter 110, 110' are applied to and used to energize the ultracapacitor 120. Thus, energy applied in the form of the DC voltage and current is stored by a capacitance of the ultracapacitor 120. Once the energy is stored, it is retained by the ultracapacitor 120, such that the so-called 'energized' battery charger 100, 100' is disconnected from the external energy source 106. Moreover, the capacitively stored energy of the ultracapacitor 120 is available to charge the battery 102 whether or not the battery charger 100 is connected to the external energy source 106.

According to the invention, the energized battery charger 100, 100' charges the battery 102 while the battery charger 100, 100' is disconnected from the external energy source 106. However, it is within the scope of the present invention for the energized battery charger 100, 100' to be connected to the external energy source 106 while the battery charger 100, 100' charges the battery. In particular, the energized battery charger 100, 100' is connected to the battery 102 and the energy stored therein charges the battery 102. In some embodiments, the battery 102 is charged in situ within the device 104. In other embodiments, the battery 102 is removed from the device 104 prior to charging.

The battery charger 100, 100' optionally further comprises means for power conditioning 130 at an output of the ultracapacitor 120. An input of the power conditioning means 130 is connected to the output of the ultracapacitor 120. An output of the optional power conditioning means 130 is ultimately connected to the battery 102 when charging the battery 102. The power conditioning means 130 is any device or circuit that conditions a voltage and/or a current of the ultracapacitor 120, such that the voltage and/or current are made suitable for charging the battery 102.

In some embodiments, the power conditioner means 130 is a DC—DC converter that converts a voltage of the ultracapacitor 120 into another voltage that is better suited for charging the battery 102. The DC—DC converter 130 may be any of the various DC—DC converters known in the art including, but not limited to, linear regulators, switching regulators and converters, and charge pump converters. For example, the DC—DC converter 130 may be a MAX679 Step Up Regulated Charge Pump Converter marketed by Maxim Integrated Products, Sunnyvale, Calif., USA. The choice of a specific DC—DC converter 130 for a given battery charger 100, 100' is dependent on the specific charging application and the battery 102 being charged. One skilled in the art can readily make such a choice without undue experimentation.

In other embodiments, the power conditioner means 130 may regulate a voltage and a current produced by the ultracapacitor 120 to prevent damage to the battery 102 during charging. In yet other embodiments, the power conditioner means 130 may be a circuit or device specifically designed for charging a rechargeable battery. For example, one such device is a MAX1645 Advanced-Chemistry-Independent, Level-2 Battery Chargers with Input Current Limiting manufactured by Maxim Integrated Products, Sunnyvale, Calif., USA. Again, one of ordinary skill in the art is familiar with numerous power conditioners and the application of power conditioning to a voltage and/or a current being used to charge a battery. All such power conditioners are within the scope of the present invention.

The power conditioner means 130 is preferred when the battery 102 is being charged directly (i.e., external to the device 104) by the battery charger 100, 100'. Thus, whether being used for in situ charging or external charging, the battery charger 100, 100' preferably provides power conditioning while charging the battery 102. In certain other embodiments, the device 104 may provide power conditioning of a charging voltage and current, thus mitigating the inclusion of the power conditioner means 130 in the battery charger 100, 100' of the present invention for in situ charging. Nevertheless, the battery charger 100, 100' of the present invention optionally comprises the power conditioning means 130, even when the device 104 provides for power conditioning. As mentioned above, such conditioning means 130 depend on the charging application and the specific battery being charged.

Figure 3:
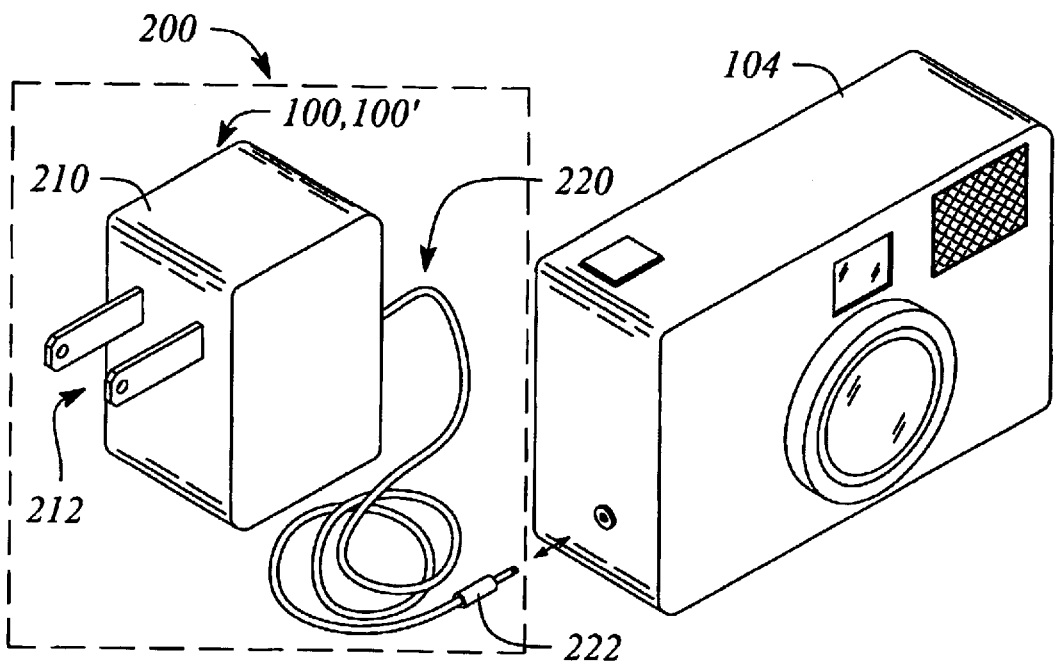
FIG. 3 illustrates a perspective view of an embodiment of the battery charger according to the invention associated with an exemplary battery-powered device.

According to the present invention, the battery charger 100, 100' may be realized in a variety of different system embodiments. FIG. 3 illustrates a battery charging system 200 that is packaged in a form similar to a conventional AC adaptor unit. The battery charging system 200 is illustrated in FIG. 3 within a dashed-line along with an example of a battery-powered device 104 in the form of a camera. The battery charging system 200 comprises the battery charger 100, 100' housed in a housing 210 means for connecting 220 the charger 100, 100' to a battery for charging and means for connecting 212 the battery charger 100, 100' to an external energy source.

The energy source connecting means 212 illustrated in FIG. 3 is an electrical plug 212 embodiment adapted for connecting to a conventional AC electrical outlet, for example. The electrical plug 212 comprises either a 2-prong electrical plug or a 3-prong electrical plug. FIG. 3 illustrates a 2-prong plug 212 also by way of example. In another embodiment not illustrated, the source connecting means 212' is an electrical plug 212' adapted for connecting to a conventional DC outlet or port, such as those provided in an automobile or an airplane, for example.

The charge connecting means 220 is illustrated in FIG. 3 as a charging cord 220, according to some embodiments. The charging cord 220 comprises an elongated electrical cord and a connector 222 located at one end of the cord for ultimately electrically connecting to a battery. As illustrated in FIG. 3, the connector 222 is located at a distal end of the charging cord 220 while a proximal end of the charging cord 220 is connected to the housing 210. The charging cord 220 is either removably connected to the housing 210 or essentially permanently connected to the housing 210 at the proximal end of the cord 220. The charging cord 220 connects the battery charger 100, 100' enclosed within the housing 210 to the device 104 for in situ charging of the battery, as illustrated in FIG. 3. Alternatively, the cord 220 connects the battery charger 100, 100' to a battery tray or carrier (not illustrated) for charging a rechargeable battery external to the device 104. Preferably, the connector 222 removably connects the charging cord 220 to the device 104 or to the battery tray.

The battery charging system 200 might appear physically similar to a conventional AC adaptor externally. However, the battery charging system 200 stores energy while the conventional AC adaptor does not. As such, the battery charging system 200 is physically and electrically different from the conventional AC adaptor internally. Further, the battery charging system 200 includes the energy storing means 120, which is not found in the conventional AC adaptor. Therefore, the battery charging system 200 may be, and generally is, somewhat larger than a conventional AC adaptor.

Figure 4:
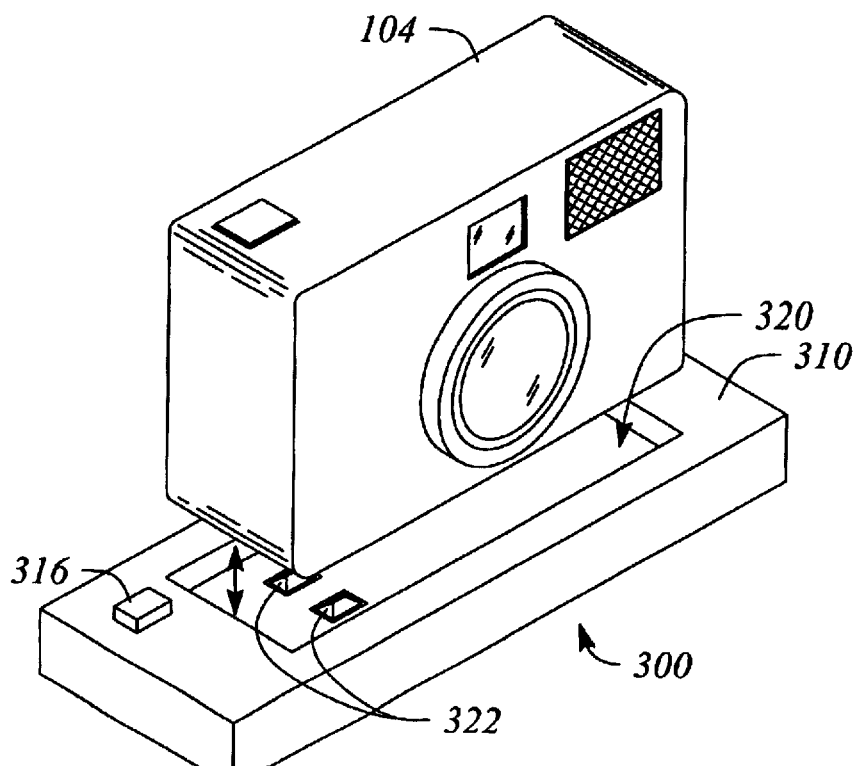
FIG. 4 illustrates a perspective view of another embodiment of the battery charger according to the present invention associated with an exemplary battery-powered device.

FIG. 4 illustrates the battery charger 100, 100' in a battery charging system 300 in the form of a docking port or cradle. The battery charging docking port system 300 comprises the battery charger 100, 100' enclosed in a docking port housing 310, and a charge connecting means 322. The housing 310 comprises a recess, slot or depression 320 adapted to receive the device 104. The charge connecting means 322 is located within the recess and electrically connects to a battery within the device 104 when the device 104 is inserted into the recess for in situ charging. The battery charging system 300 further comprises an energy source interconnecting means (not illustrated) to connect to a fixed external energy source to energize the battery charger 100, 100'.

To energize the battery charger 100, 100', the docking port system 300 is electrically connected to an AC wall outlet or a DC outlet with the energy source interconnection means. In some embodiments, the energy source interconnection means is similar to the plug embodiments 212, 212' described above for the battery charger system 200. In preferred embodiments, the energy source interconnection means of the battery charger systems 200, 300 are retractable. For example, the prong plug 212, 212' is extended from the housing 210, 310 for energizing the battery charger 100, 100', and is retracted into the housing 210, 310, such that the plug 212, 212' is flush with a housing surface, after energizing is completed. In other embodiments, the energy source interconnection means is similar to that described below for FIG. 5.

The battery charging systems 200, 300 are electrically connected to the AC outlet or the DC outlet for a relatively short period of time to energize the energy storing means 120. The specific length of the short period of time is determined by the embodiment of the energy storing means 120. For the preferred ultracapacitor 120 embodiment, the length of the short period of time is determined by a capacitance of the ultracapacitor 120 and a maximum current that can flow into the battery charging system 200, 300.

With respect to the docking port system 300, the device 104, for example a camera 104 as illustrated in FIG. 4, is placed in the recess or depression 320 to effect in situ charging of the battery 102 within the device 104. The charge connecting means 322 are electrical contacts 322 located within the recess 320. The electrical contacts 322 are adapted to mate with and electrically connect to contacts on a surface of the device 104 (not illustrated). Depending on the embodiment, the electrical contacts 322 comprise one or a combination of pressure contacts, friction contacts, mechanical contacts or other means of contacting including, but not limited to, mating male/female connectors. Charge connecting means 322 other than the electrical contacts including, but not limited to, inductive coupling, may be substituted for or used in addition to the electrical contacts 322 and still be within the scope of present invention. Moreover, additional fastening means may be employed, such that the contacts or the fastening means physically hold the device 104 to the battery charger system 300 for charging. The additional fastening means facilitate holding the device 104 in the recess 320 while being transported, for example.

When the device is placed in the recess 320, the docking port system 300 charges the battery 102 of the device 104 in situ. In some embodiments, the housing 310 further comprises an indicator means 316 on a surface of the housing 310, such as a light emitting diode (LED) or other indicator. In some embodiments, the indicator 316 indicates that the docking port system 300 has sufficient energy for charging the battery 102. In other embodiments, the indicator indicates that the docking port system 300 has insufficient energy and needs to be re-energized. In still other embodiments, both sufficient energy and insufficient energy conditions are indicated. Moreover, some embodiments optionally comprise an indicator (not illustrated) that informs the user whether the inserted device 104 is making electrical contact with the battery charging system 300.

In yet other battery charging system embodiments (not illustrated), the battery charger 100, 100' may be incorporated into a tripod for use with the device 104 when the device is a camera 104 or other device that employs a tripod. For example, the battery charger 100, 100' may be enclosed in a portion of a mounting fixture of the tripod. When the camera 104 is connected to the tripod, an electrical connection is made between the battery charger 100, 100' and the camera 104.

Figure 5:
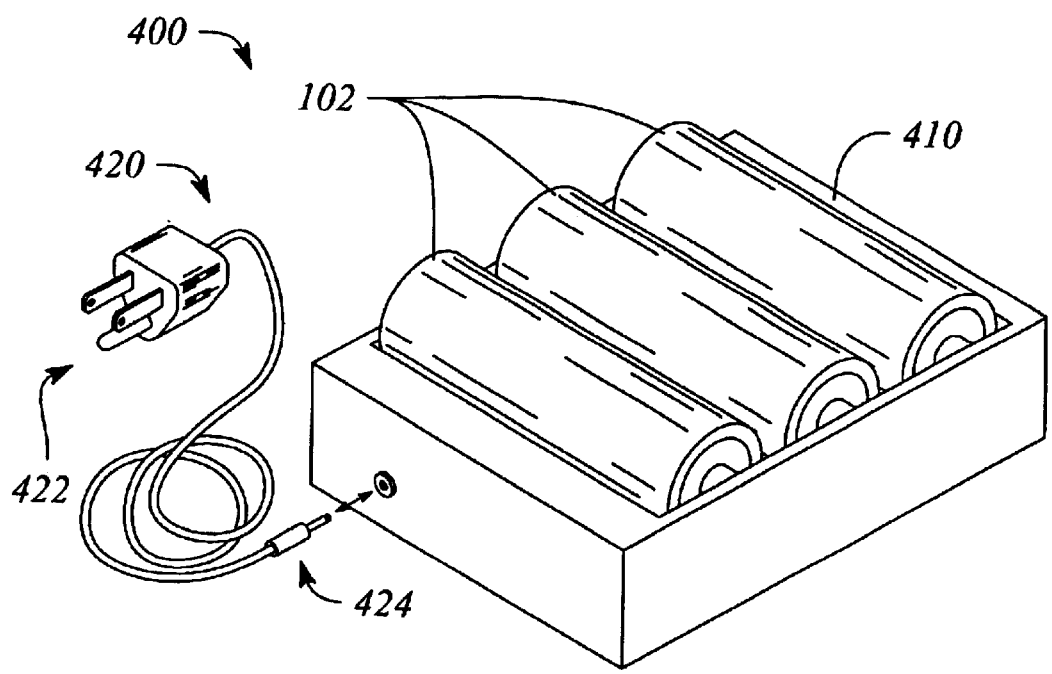
FIG. 5 illustrates a perspective view of another embodiment of the battery charger according to the present invention associated with an exemplary plurality of rechargeable batteries.

FIG. 5 illustrates another embodiment of a battery charging system 400 in the form of a battery-charging tray 400. The battery-charging tray system 400 charges the battery 102 external to the device 104. The battery-charging tray 400 accepts and charges the battery 102, after the battery 102 has been removed from the device 104. As illustrated in FIG. 5, the battery charging tray system 400 comprises the battery charger 100, 100' enclosed in a housing 410, charge connecting means (not illustrated), and energy source connecting means 420. The energy source connecting means 420 illustrated in FIG. 5 is an example of a power cord 420 embodiment.

The housing 410 further comprises a recess in a surface adapted for receiving a battery 102. The charge connecting means are electrical contacts located in the recess. The electrical contacts electrically connect to contacts on the battery 102 for charging. The power cord 420 embodiment of the energy source connecting means comprises at one end plug means 422 that is received by an external AC electrical outlet or a DC electrical outlet. At an opposite end, the power cord 420 is connected to the housing 410.

FIG. 5 illustrates an exemplary 3-prong plug 422 means for removably connecting to an AC outlet. However, this battery-charging tray system 400 is implementable with other such means 422, such as a 2-prong plug or a plug that is complementary to a DC outlet. In some embodiments, the power cord 420 may further comprise power cord connecting means 424 at the opposite end of the cord 420 for removably connecting the power cord 420 to the housing 410. The cord connecting means 424 is a connector or plug 424 that removably connects or mates with a receptacle in the housing 410. In other embodiments, the power cord 420 is essentially permanently connected (i.e., hard wired) to the housing 410 at the opposite end. In some of these embodiments, the power cord 420 is retractable into the housing 410. One skilled in the art can readily devise these and other embodiments of the means for connecting 420, 422, 424, all of which are within the scope of the present invention. Once energized, the power cord 420 is disconnected from the external energy source (e.g., the electrical outlet), and the energized battery charging tray system 400 is ready to 'cordlessly' charge the battery 102 inserted in the recess of the housing 410.

Figure 6:
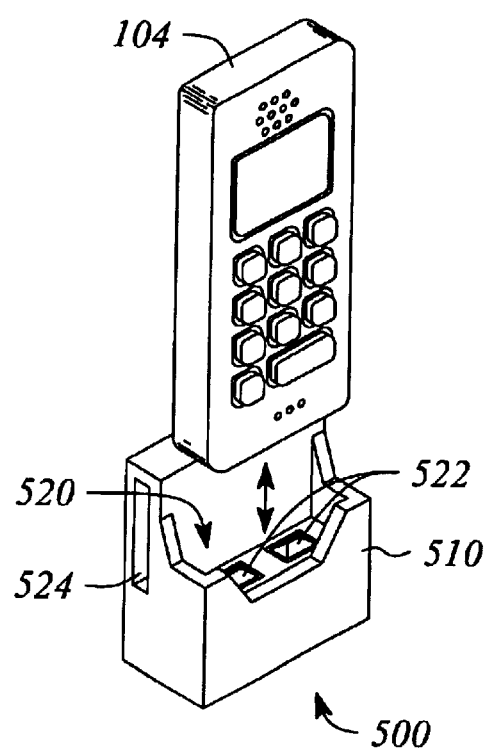
FIG. 6 illustrates a perspective view of the still another embodiment of the battery charger according to the present invention associated with another exemplary battery-powered device.

FIG. 6 illustrates another embodiment of the battery-charging system in the form of a holster 500. The battery-charging holster system 500 is adapted for carrying the device 104, for example a digital camera (not illustrated) or cellular telephone 104 (as illustrated). The holster system 500 is readily portable in that it may be worn by a user on a belt or strap, such as that associated with the user's clothing or bag, thus providing both a means for carrying the battery charger 100, 100', as well as a means for charging the battery of the device 104 while being carried.

The holster system 500 comprises the battery charger 100, 100' enclosed in a housing 510. The housing 510 has a recess 520 adapted to receive the device 104. The holster system 500 further comprises charge connecting means 522 within the recess 520 for ultimately electrically connecting the battery charger 100, 100' to a battery within the device 104. In some embodiments, the charge connecting means 522 is an electrical contact 522 within the recess 520 for electrically connecting to complementary contacts (not illustrated) on the device 104. The holster system 500 further comprises means for electrically connecting to an external energy source (not illustrated) for energizing the battery charger 100, 100'.

In some embodiments, the energy source connecting means comprises a power cord (not illustrated), such as the power cord 420 described above for the battery charging tray system 400. The power cord enables the battery charger 100, 100' to be energized when an external power source is available. For example, in an embodiment of the holster system 500 that utilizes a DC energy source, the power cord may be plugged into an auxiliary power port in an automobile to energize the battery charger 100, 100'. For an AC energy source, a power cord similar to the power cord 420 illustrated in FIG. 5 may be used.

Depending on the embodiment, the power cord is either removable (i.e., disconnectable from the holster housing 510) or retractable into the housing 510. In another embodiment, the energy source connecting means comprises a plug integral to the housing 510 (also not illustrated). The integral plug enables the holster 500 to be plugged directly into an available AC or DC electrical outlet to energize the battery charger 100, 100', as needed, without an electrical cord. In some embodiments, the integral plug means extends from a surface of the housing 510 and preferably is a foldable or retractable plug. The preferred retractable plug retracts into a position flush with the surface of the housing 510.

As with all exemplary system embodiments 200, 300, 400 described hereinabove, the holster system 500 is adapted for using one or both of the AC and DC external power sources. Once the holster system 500 is energized, the battery of the device 104 (e.g., cellular telephone) is charged whenever the device 104 is placed into the recess 520 of the holster 500 (as indicated by a double headed arrow in FIG. 6). Further in some embodiments, the holster housing 510 further comprises means for fastening the holster housing 510 to a belt, strap, clothing or bag, such that the holster system 500 is readily carried or transportable by the user. Illustrated in FIG. 6 is an embodiment of the fastening means 524 in the form of an integral slot through which a belt or strap fits to removably fasten the holster housing 510 with the belt or strap, for example. One skilled in the art can readily devise other fastening means, all of which are within the scope of the present invention.

Advantageously, according to the present invention, the battery charger 100, 100' can charge the battery 102 without being connected to the external energy source. As such, the battery charger 100, 100', according to any of the system embodiments 200, 300, 400, 500 can be energized using an available conventional AC outlet or DC outlet. Once energized, the battery charger 100, 100' is carried in luggage, suitcase, briefcase or purse (hereinafter 'bag'), for example, when traveling with a battery-powered device 104. The energy stored in the energized battery charger 100, 100' is readily available and accessible to the traveler for charging the battery 102 of the device 104 while moving from place to place. For example, the device 104 can be inserted into the depression slot 320 of the energized docking port system 300 in the bag, such that the battery 102 is being charged while traveling from place to place. Similarly, the energized battery charging system 200 can charge the battery 102 while being carried in a bag. Moreover, the energized battery charger 100, 100' is available for conveniently charging the battery 102 at any time when an AC electrical outlet or a DC electrical outlet is not available or is not convenient.

In yet another aspect of the present invention, a method 600 of charging a rechargeable battery of a battery-powered device is provided. The method 600 comprises charging 620 the battery with energy stored in a portable means for storing energy or a portable energy storage device. In some embodiments, charging 620 the rechargeable battery is performed in situ with the battery installed in the device. In other embodiments, charging 620 is performed with the battery removed from the device.

Figure 7:
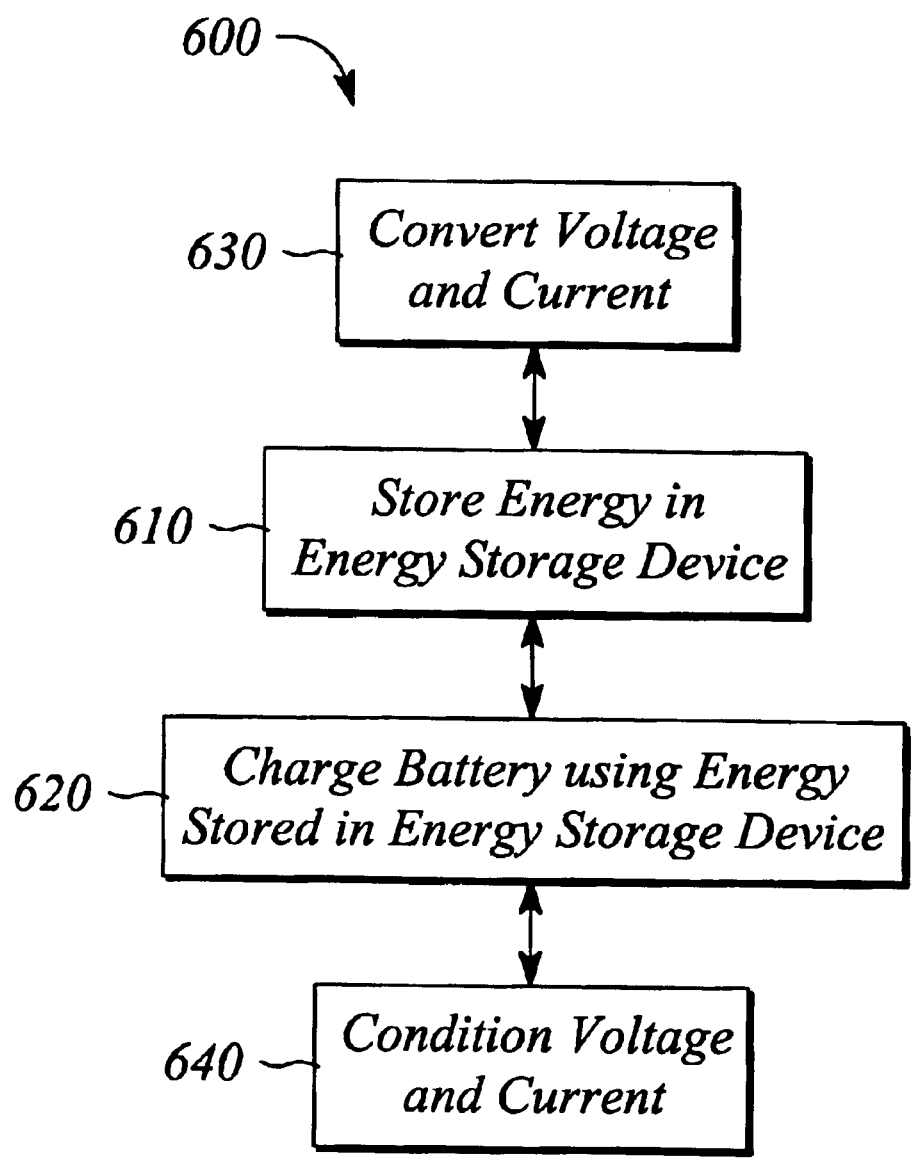
FIG. 7 illustrates a flow chart of a method of charging a rechargeable battery according to the present invention.

A flow chart of a preferred embodiment of the method 600 is illustrated in FIG. 7 and further comprises storing energy 610 in the energy storage device. Preferably, the energy storage device is an ultracapacitor, a capacitor or a rapid-charging battery. Also preferably, the energy is rapidly stored in the energy storage device. More preferably, the energy is stored prior to charging the battery, such that the charging of the battery is advantageously independent and effectively cordless charging. As described above, a time that it takes to store the energy in the energy storing device is rapid relative to a time that it takes to charge the battery. Further as described above, the amount of energy that is stored rapidly in the energy storing device is sufficient to charge the rechargeable battery, such that the recharged battery provides power during a normal or typical operational time of the device.

The method 600 of the preferred embodiment may further comprise acquiring energy from an external energy source and converting 630 the energy into a form that is stored by the energy storage device. Preferably, acquiring energy comprises electrically connecting the storage device to the external energy source such as, but not limited to, an AC electrical outlet or DC auxiliary equipment port. Converting 630 comprises transforming a voltage and a current from the external energy source into a voltage and a current that is suitable for storage by the storage device. Such converting 630 precedes storing 610 when optionally performed. Once acquiring and converting 630 and storing 610 are complete, the storage device is preferably disconnected from the external energy source.

For example, converting 630 may comprise transforming an AC voltage and an AC current from an AC energy source into a DC voltage and a DC current suitable for use with the storage device, such as the preferred ultracapacitor. In another example, converting 630 may comprise converting a DC voltage and a DC current of a DC energy source into a DC voltage and a DC current suitable for use with the preferred ultracapacitor. Suitability of the voltage and the current when using the preferred ultracapacitor to store 610 energy is discussed in more detail above. Additionally, detailed information regarding voltage and current suitability is available from manufacturers and/or suppliers of ultracapacitors. One skilled in the art can readily determine the suitability of the voltage and the current without undue experimentation.

The method 600 optionally may further comprise conditioning 640 the stored energy in the storage device prior to charging 620 the battery. Preferably, conditioning 640 comprises adapting a voltage and a current of the preferred ultracapacitor, wherein the battery is charged using the ultracapacitor voltage and current. For example, the voltage of the preferred ultracapacitor may be conditioned 640 by performing a DC—DC conversion of the ultracapacitor voltage. In another example, a current of the preferred ultracapacitor may be limited or regulated by conditioning 640 prior to charging 620 the battery.

Thus, there have been described several embodiments of a battery charger 100, 100' and battery charging systems 200, 300, 400, 500 that employ the battery charger 100, 100'. Further, several embodiments of a method 600 of charging a rechargeable battery have been described. It should be understood that the above-described embodiments are merely illustrative of the some of the many specific embodiments that represent the principles of the present invention.

Clearly, those skilled in the art can readily devise numerous other arrangements without departing from the scope of the present invention as defined by the following claims.

What is claimed is:

1. A battery charger that stores energy comprising:
   means for power converting energy acquired from an external energy source; and
   means for storing energy connected to an output of the power convening means, wherein the power converting means converts the acquired energy into a form that is stored by the energy storing means, the energy being stored until used to charge a battery, and wherein storage of energy from the external energy source is independent of battery charging, and wherein the energy storing means stores the energy rapidly relative to a time for charging the battery.

2. The battery charger of claim 1, farther comprising:
   means for power conditioning the energy stored in the energy storing means, the power conditioning means adapting the stored energy for charging the battery.

3. The battery charger of claim 1, wherein the power converting means comprises a converter that converts an alternating current (AC) and an AC voltage (VAC) from the external energy source into the form of a direct current (DC) and a DC voltage (VDC) that is storable by the energy storing means.

4. The battery charger of claim 1, wherein the power converting means comprises a converter that converts a direct current (DC) and a DC voltage (VDC) from the external energy source into the form of a direct current (DC) and DC voltage (VDC) that is storable by the energy storing means.

5. The battery charger of claim 1, wherein the power converting means comprises one or both of an AC-DC converter that converts an alternating current (AC) from the external energy source, and a DC—DC converter that converts a direct current (DC) and DC voltage (VDC), each of the converters converting the power into a direct current (DC) and a DC voltage (VDC) that is storable by die energy storing means.

6. The battery charger of claim 1, wherein the energy storing means is an ultracapacitor.

7. The battery charger of claim 1, wherein the energy storing means is a capacitor.

8. The battery charger of claim 1, wherein the energy storing means is a rapid-charging battery that stores energy in seconds or minutes rather than one or more hours.

9. The battery charger of claim 1, wherein once the energy is stored in the energy storing means, the energized battery charger charges the battery untethered from the external energy source.

10. The battery charger of claim 1, wherein the external energy source is either an alternating current (AC) energy source that is accessible from a AC outlet or a direct current (DC) energy source that is accessible from a DC outlet, each of the energy sources and the respective outlets being fixed relative to a portability of the battery charger.

11. A battery charging system comprising:
    a housing comprising a battery charger;
    means for connecting the battery charger to an external energy source to acquire energy; and
    means for connecting the battery charger to a battery for charging the battery,
    wherein the battery charger comprises a power converter and mean, for storing energy connected to an output of the power converter, an input of the power converter being connected to the energy source connecting means, an output of the energy storing means being connected to the battery charge connecting means, the energy storing means storing energy acquired from the external energy source and converted by the power converter, and
    wherein the energy is stored by the energy storing means until the battery charge connecting means electrically connects the battery charger to the battery for charging, the storage of energy acquired from the external energy source being independent of charging the battery, the storage of energy by the energy storage means being rapid relative to a time for charging the battery.

12. The battery charging system of claim 11, wherein the energy source connecting means comprises a plug adapted to be received by one or both of an alternating current (AC) outlet and a direct current (DC) outlet, the external energy source being one of an AC energy source and a DC energy source, respectively.

13. The battery charging system of claim 12, wherein the plug is integral to the housing.

14. The battery charging system of claim 13, wherein the integral plug is movable, such that the plug is extended from a surface of the housing when adapted to be received by the respective outlet and is retracted against the housing surface when not in use.

15. The battery charging system of claim 12, wherein the energy source connecting means farther comprises an electrical cord connected at a first end to the plug and connected at a second end to the housing, the second end being opposite to the first end, the second end of the cord being electrically connected to the battery charger.

16. The battery charging system of claim 15, wherein the electrical cord is movably extended from and retracted into the housing.

17. The battery charging system of claim 15, wherein the energy source connecting means further comprises a connector that removably connects the second end of the cord to the housing.

18. The battery charging system of claim 11, wherein the housing further comprises a recess, the battery charge connecting means being located in the recess.

19. The battery charging system of claim 18, wherein the recess is adapted to receive one or more of the battery for charging, the battery charge connecting means connecting to electrical contacts on the battery when the battery is received in the recess, and a battery-powered device having the battery to be charged, the battery charge connecting means connecting to device connecting means on the device when the device is received in the recess, such that electrical connection to the battery is achieved.

20. The battery charging system of claim 18, wherein the housing is either a battery tray, a docking port or a holster, the battery tray receiving one or more of the battery for charging in the recess, the docking port and the holster each receiving a battery-powered device in the recess for in situ battery charging.

21. The battery charging system of claim 11, wherein the energy storing means is one or more of a capacitor, an ultracapacitor and a rapid-charging battery.

22. A method of charging a rechargeable battery comprising:
    charging the battery with energy stared ma portable energy storage device, wherein the portable energy storm device stores the energy rapidly relative to a time for charging the battery with the stored energy.

23. The method of claim 22, further comprising:

acquiring energy from an external energy source, the energy source being fixed relative to the portability of the energy storage device; and converting the acquired energy into a than for storage in the portable energy storage device, wherein charging the battery is independent of acquiring the energy that is converted and stored.

24. The method of claim 22, further comprising:

conditioning the stored energy from the energy storage device before charging the battery.

25. The method of claim 22, wherein the portable energy storage device is one or more of a capacitor and an ultracapacitor.

26. The method of claim 22, wherein the portable energy storage device is a rapid-charging battery.

27. A battery charger that stores energy for charging a battery, the battery charger comprising:

a power converter; and an energy storage device connected to an output of the power converter, wherein the power converter converts energy acquired from an external source into a form that is stored by the energy storage device, the energy being stored by the energy storage device rapidly relative to a time for charging the battery.

28. The battery charger of claim 27, wherein the energy storage device is one or more of a capacitor and an ultracapacitor.

29. The battery charger of claim 27, wherein the energy storage device is a rapid-charging battery.

30. The battery charger of claim 27, farther comprising:

a housing that encloses the power converter and the energy storage device, the housing being in a form of an adapter unit;

an electrical plug integral to the housing and adapted for connecting to one of an AC electrical outlet or a DC outlet; and a charging cord connecting between the housing and a battery-powered device, wherein the battery is a battery of the battery-powered device and wherein the battery charger provides in situ charging of the battery using the stored energy.

31. The battery charger of claim 27, further comprising:

a housing in a form of a docking port that receives a battery-powered device, wherein the battery is a battery of the battery-powered device, and wherein the battery charger provides in situ charging of the battery using the stored energy.

32. The battery charger of claim 27, further comprising:

a housing in a form of a holster that receives a battery-powered device, the holster being adapted for carrying the device, wherein the battery is a battery of the battery-powered device, and wherein die battery charger provides in situ charging of the battery using the stored energy.

33. The battery charger of claim 27, further comprising:

a housing in a form of a battery-charging tray that accepts and charges the battery using the stored energy.

* * * * *